CARTRIDGE RETRACTION MECHANISM FOR PHONOGRAPH TONE ARMS

Filed Aug. 3, 1962

INVENTOR.
Robert J. Hammond
BY
Brown, Jackson, Boettcher & Dienner
Att'ys.

INVENTOR.
Robert J. Hammond
BY
Brown, Jackson, Boettcher & Dienner
Att'ys.

CARTRIDGE RETRACTION MECHANISM FOR PHONOGRAPH TONE ARMS

Filed Aug. 3, 1962 3 Sheets-Sheet 3

INVENTOR.
Robert J. Hammond
BY
Brown, Jackson, Boettcher & Dienner
Att'ys.

United States Patent Office 3,139,284
Patented June 30, 1964

3,139,284

CARTRIDGE RETRACTION MECHANISM FOR PHONOGRAPH TONE ARMS

Robert J. Hammond, Stevensville, Mich., assignor to V-M Corporation, Benton Harbor, Mich., a corporation of Michigan Filed Aug. 3, 1962, Ser. No. 214,642
10 Claims. (Cl. 274—24)

The present invention relates to phonograph tone arms of the type which embody a cartridge mounted in a compliant manner so as to be movable vertically relative to the tone arm. More specifically, the invention relates to mechanism associated with such a tone arm which will engage a record being reproduced when the tone arm is depressed downwardly a predetermined amount and thereby raise the cartridge from the record as the tone arm is further depressed.

It is known that certain significant advantages can be obtained by providing a phonograph tone arm with a compliantly mounted cartridge rather than with a more conventional rigid cartridge which is not movable relative to the tone arm. A compliant cartridge may be mounted on horizontal pivot pins, on a leaf spring, or in various other ways, the essential characteristic being that when the corresponding tone arm is depressed downwardly relative to a record being reproduced (or where the record is displaced upwardly), the cartridge is adapted to retract upwardly into the tone arm.

Cartridges of the foregoing type have the advantage of tending to protect the needle, and also a record being reproduced thereby, from the effects of shock. Another important advantage of such devices is that the relatively small mass of the cartridge is better able to follow rapid movements and thus better adapted to track a warped record than is the tone arm itself, and where a compliant cartridge is used it is permitted to track the record independently of the tone arm.

While it is advantageous to provide a vertically compliant cartridge whereby the needle will retract upwardly into the tone arm if a downward force is accidentally applied to the arm, and while such an arrangement will offer some protection against damage both to the needle and to a record being reproduced thereby, it will be noted that the force which retracts the cartridge is normally transmitted through the needle. In addition, while the needle will retract into the tone arm, it will remain in engagement with the record being reproduced.

The principal object of the present invention is to provide cartridge retracting mechanism for use with a tone arm having a vertically compliant cartridge, whereby when the tone arm is depressed downwardly in excess of a predetermined amount, the retracting mechanism will engage the record and raise the cartridge from the record.

Heretofore it has been proposed to provide a projecting finger or the like on a stylus whereby the finger will normally be positioned clear of a record being reproduced but will engage the record and thus lift the needle when the latter is overloaded. However, such devices, while they may offer some protection to the needle, are not wholly satisfactory in that they tend to cause an undesirable increase in mechanical dynamic impedance and tend to produce undesirable resonances.

Similar proposals have been made to attach a projecting member to the cartridge whereby when the tone arm is depressed so as to sufficiently vary the angle between the cartridge and a record being reproduced, the projecting member will engage the record rather than the needle. However, such known designs are limited in their usefulness since in most record changer applications it is necessary to make substantial allowance for differing angles between the tone arm and a record being reproduced due to the record warpage, cartridge bobbing action or vertical travel of the cartridge, and also because of the substantial variation in the height of a record being reproduced depending upon the number of records stacked on the turntable.

Accordingly, it is a more specific object of the present invention to provide cartridge retraction mechanism which is mounted directly on the tone arm independently of the cartridge and the needle, and which will engage a record being reproduced and lift the cartridge therefrom upon depression of the tone arm beyond a predetermined amount.

Other objects, uses and advantages of the invention will become apparent, or be obvious, from the following specification, particularly when considered in connection with the drawings in which.

Figure 1:
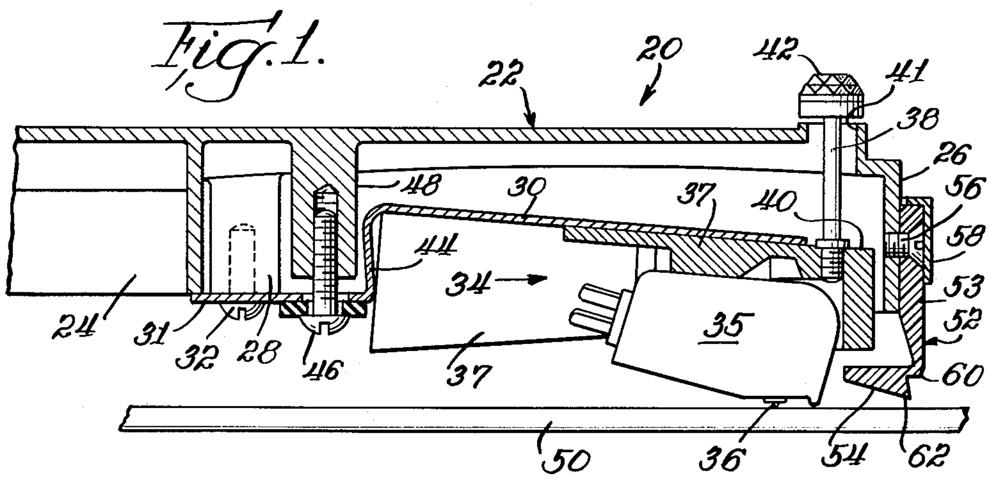
FIGURE 1 is a fragmentary vertical section of the head portion of a phonograph tone arm having a vertically compliant cartridge supported from the tone arm with the needle thereof in engagement with a record in playing position, and embodying cartridge retraction mechanism in accordance with the present invention.

Referring now to the drawings, FIGURE 1 shows the head portion 20 of a tone arm housing comprising a top wall indicated generally at 22, a side wall 24, and an outer end wall 26. The tone arm housing includes a pair of integral mounting bosses, one of hwich is shown at 28, which project downwardly from the underside of the top wall and serve to mount in cantilever fashion a cartridge spring bracket 30. A rear portion 31 of the spring bracket 30 is secured to the tone arm housing by a pair of screws such as a screw 32 which is threaded into the boss 28.

A cartridge assembly 34, comprising a cartridge 35, a needle 36, and a relatively heavy mounting bracket 37, is secured to the underside of the forward portion of the spring bracket 30 by screws or other suitable fastening means (not shown). A rod 38 is threaded into the top of a forward end 40 of the bracket 37 so as to extend upwardly through an aperture 41 formed in the tone arm top wall 22, whereby the vertical movement of a head portion 42 on the rod will indicate the extent to which the cartridge assembly is moving vertically relative to the tone arm during reproduction of a record.

The spring bracket 30 is preferably made from a thin sheet or strip of metal, and is supported immediately inwardly or to the left of an offset portion 44 by an adjusting screw 46 which extends through the bracket and into threaded engagement in a boss 48 which projects downwardly from the tone arm wall 22.

In operation, the tone arm 20 is balanced about its own horizontal pivot axis (not shown) to provide a desired predetermined needle pressure between the needle 36 and a record such as shown at 50. When the tone arm 20 is set down on a record, the cartridge assembly 34 remains free to move vertically relative to the tone arm, since the spring bracket 30 will readily bend at the lower end of the offset portion 44, the extent of bending for a given needle load being determined by the material employed for the bracket 30, and by the width and thickness of the bracket at the lower end of the offset portion 44 where substantially all of the bending will occur. During reproduction of a record, the cartridge 35 will move vertically through a range of travel, the upper and lower limits of which will be approximately equidistant above and below a predetermined intermediate position, the latter being determined by adjustment of the screw 46.

A more complete description of the foregoing cartridge mounting mechanism will be found in my copending application Serial No. 195,856, filed May 18, 1962, and assigned to the assignee of the present invention. It should be understood that the specific vertically compliant cartridge described herein is merely by way of example to illustrate my cartridge retraction mechanism, the latter having equal applicability with various other types of compliant cartridges.

Figure 3:
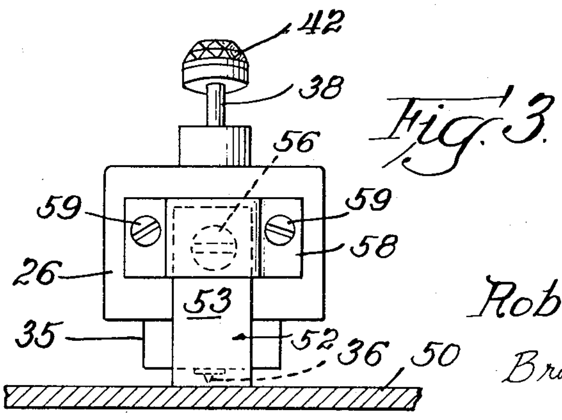
FIGURE 3 is an end elevational view taken substantially along the line 3—3 of FIGURE 2.

In accordance with the present invention, FIGURE 1 shows a scrubber or retracting member 52 comprising an upper generally vertical portion 53 and a lower generally horizontal portion 54. The retracting member 52 is secured to the outer end wall 26 of the tone arm by any suitable fastening means such as a screw 56 which extends through the member 52 and into threaded engagement in the wall 26. A retaining clip 58 or the like may also be utilized, if desired, and as shown in FIGURE 3 the clip is secured to the tone arm wall 26 by a pair of screws 59.

Figure 2:
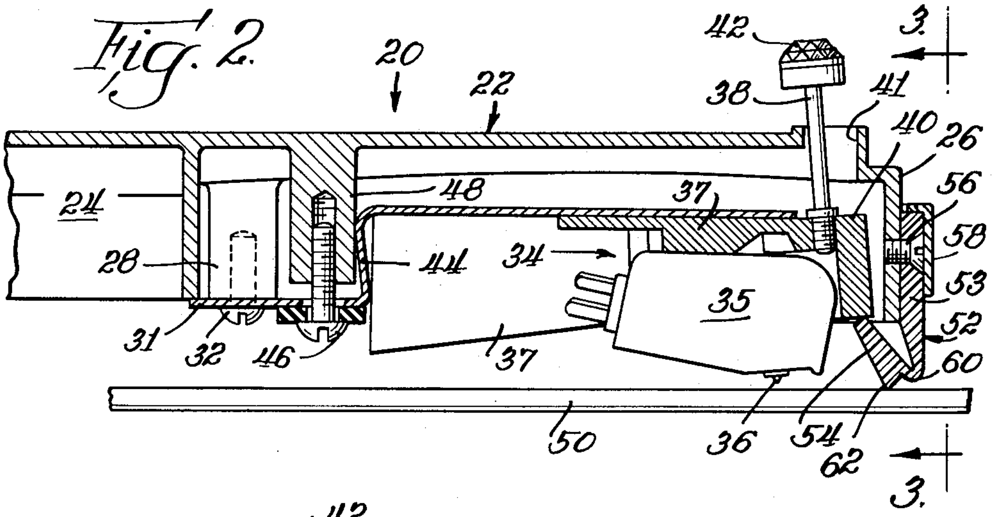
FIGURE 2 is a view similar to FIGURE 1 showing the tone arm depressed downwardly toward the record and showing the cartridge raised from the record.

The retracting member 52 is preferably made of compliant plastic or the like, and is provided with a thin flexible portion 60 joining the upper and lower end portions 53 and 54, so as to permit the member to bend generally as shown in FIGURE 2 when the tone arm is depressed downwardly causing the retracting member to engage the record 50. It will be seen that the lower leg 54 of the retracting member 52 extends underneath the forward end 40 of the cartridge mounting bracket 37, and the leg 54 has a downwardly projecting portion 62 which will engage the record 50 when the tone arm 20 is depressed a predetermined amount.

When the portion 62 engages the record 50, it bends the retracting member at the thin flexible portion 60 so as to cause the lower leg 54 to engage against the underside of the bracket end 40 and thereby lift the cartridge 35 and needle 36 away from the record. As stated above, the retracting member 52 is preferably made of compliant plastic, but in any event it should be made of a material which is flexible and which will not damage the record as it slides thereon. If deemed necessary, the projecting portion 62 on the lower leg 54 can be rounded off or made smooth so as to protect the record against scratching.

The retracting member 52 described hereinabove provides an unusually effective means for lifting the cartridge 35 from the record when the tone arm is accidentally depressed downwardly. It will be noted that in the normal playing position of the cartridge as shown in FIGURE 1, there is a clearance between the underside of the bracket end 40 and the lower leg 54 of the retracting member. Such a clearance is necessary to permit the cartridge to bob up and down through its usual range of vertical travel during reproduction of a record; and the clearance should be regulated to permit whatever maximum range of travel is desired for the cartridge.

Figure 4:
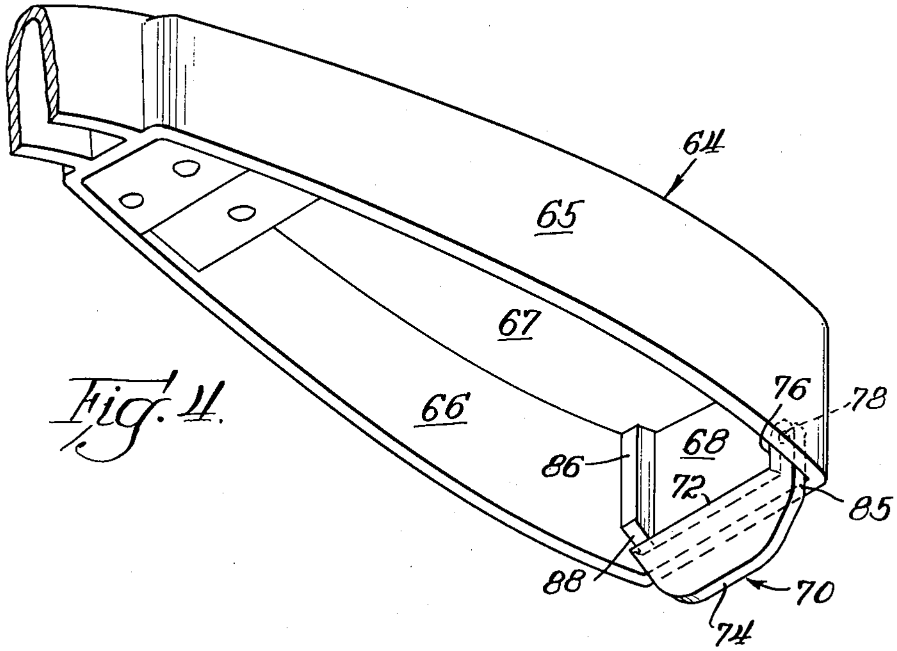
FIGURE 4 is a fragmentary perspective view of the head of a tone arm embodying an alternative form of cartridge retraction mechanism in accordance with the invention, the cartridge itself being removed for purposes of illustration.
Figure 5:
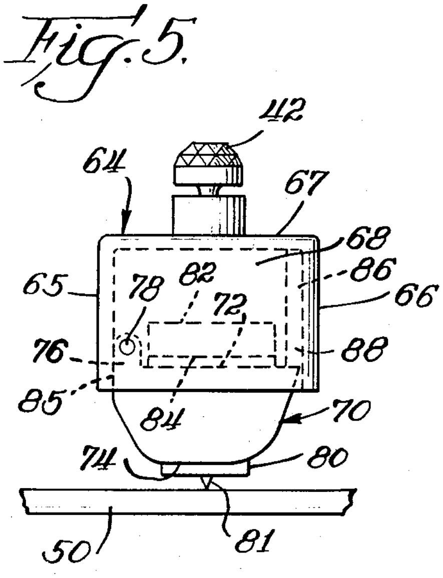
FIGURE 5 is an end elevation of the tone arm and retraction mechanism of FIGURE 4 showing a cartridge-needle assembly with the needle in engagement with a record to be reproduced.
Figure 6:
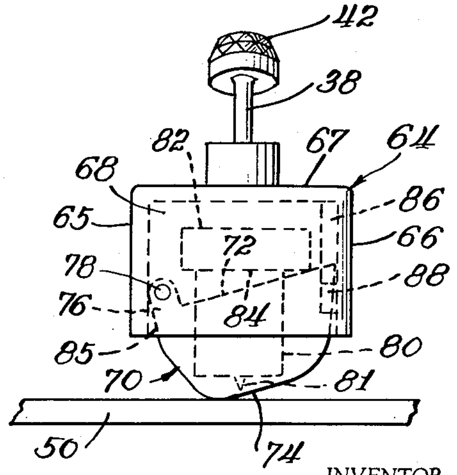
FIGURE 6 is a view similar to FIGURE 5 showing the tone arm depressed downwardly toward the record and showing the cartridge raised from the record by the retraction mechanism.

FIGURES 4–6 shows a tone arm 64 having side walls 65 and 66, a top wall 67, and an outer end wall 68. The tone arm 64 embodies an alternative form of cartridge retraction mechanism comprising a retracting member or lift member 70 made from a sheet of flexible material such as compliant plastic or the like. The member 70 may be formed with generally flat top and bottom surfaces 72 and 74, and one side thereof is provided with an upwardly projecting ear 76 whereby the member 70 is pivotally secured to the tone arm wall 68 by a pivot pin 78. The pin 78 may, if desired, comprise a rivet which passes through the tone arm wall 68 and through the projecting ear 76.

FIGURES 5 and 6 show a cartridge 80 and needle 81 which are compliantly supported from the tone arm, for example as described in conjunction with FIGURE 1. There is also shown a forward end portion 82 of a cartridge mounting bracket, the end portion being provided with a generally horizontal shoulder or ledge 84 adapted to cooperate with the upper surface 72 of the lift member 70.

FIGURE 5 shows the lift member 70 in its normal downward position wherein a flat side portion 85 thereon abuts against the tone arm side wall which acts as a downward stop for the lift member. The cartridge 80 is shown in playing position with the needle 81 in engagement with a record 50. In operation, when the tone arm is depressed downwardly toward the record, the lift member 70 engages the record and is pivoted upwardly relative to the tone arm. During such upward pivotal movement, it engages under the ledge 84 on the cartridge bracket 82 so as to lift the cartridge and needle from the record, as shown in FIGURE 6.

In the embodiment shown in FIGURES 4–6, the lift member 70 is not normally disposed immediately beneath the ledge portion 84, but rather is spaced forwardly therefrom. It is often preferable to provide such misalignment between the lift member and the cartridge supporting bracket so as to normally maintain the lift member out of the path of travel of the cartridge and cartridge supporting bracket during reproduction of a record. The cartridge is then free to bob up and down without any possibility of interference from the retractor or lift member.

In the embodiment being described, a generally vertical boss 86 is provided at the inside of the tone arm side wall 66 where the latter meets the outer end wall 68, and an inclined cam surface 88 is formed on the lower end of the boss for cooperation with the upper surface 72 of the lift member 70. It will thus be understood that when the lift member is pivoted upwardly relative to the tone arm upon engagement with a record, it is guided rearwardly by the cam 88 which causes it to be aligned with the ledge 84, whereby upon further upward movement of the lift member it will engage under the ledge 84 and raise the cartridge 80 from the record. The lift member 70 is preferably made of relatively flexible material so that it will bend near its pivot under the influence of the cam 88.

Figure 7:
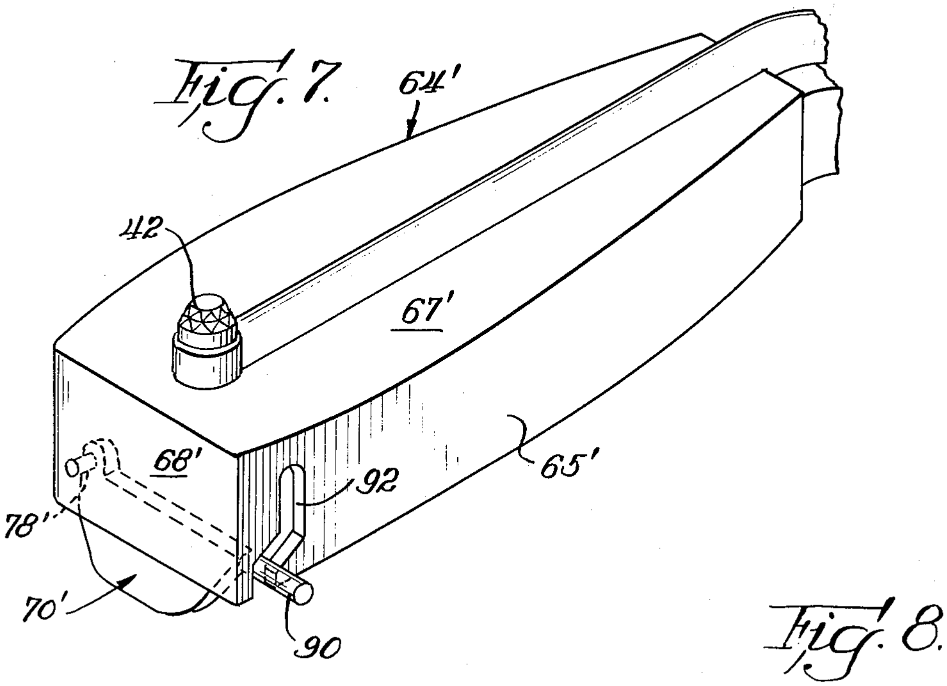
FIGURE 7 is a fragmentary perspective view showing the head portion of a tone arm embodying a further form of cartridge retraction mechanism according to the invention.
Figure 8:
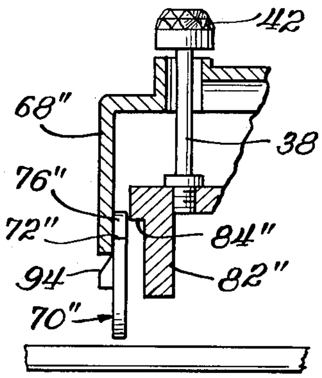
FIGURE 8 is a fragmentary vertical section of a portion of the head of a phonograph tone arm embodying still another form of cartridge retraction mechanism in accordance with the invention.

FIGURES 7 and 8 show modified forms of the embodiment of FIGURES 4–6. In FIGURE 7 a lift member 70′ is pivoted at 78′ and the member is provided with a laterally projecting pin 90 at its free end which extends through an inclined cam slot 92 formed in a tone arm side wall 65′. The cooperation between the pin 90 and slot 92 causes the lift member 70′ to be bent rearwardly and thereby guided under a ledge on the cartridge mounting bracket in order to raise the latter when the lift member is pivoted upwardly.

Figure 9:
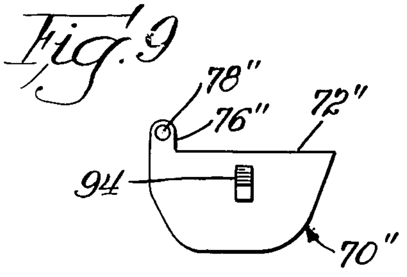
FIGURE 9 is a detail elevational view of one component of the cartridge retraction mechanism embodied in the tone arm of FIGURE 8.
Figure 10:
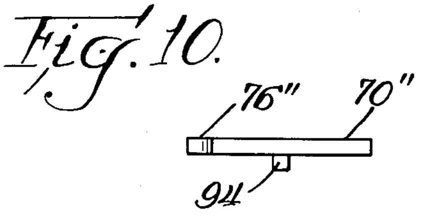
FIGURE 10 is a detail top plan view of the component shown in FIGURE 9.

FIGURE 8 shows still another modification wherein a cam surface 94 is formed on the front face of a lift member 70'' (see also FIGURES 9 and 10) for engagement with the underside of an outer end wall 68'' of the tone arm housing. In this manner, as the lift member 70'' is pivoted upwardly relative to the tone arm, it is guided rearwardly so that the upper surface 72'' thereof will engage under a ledge 84'' on a cartridge bracket 82'', and thereby effect the retraction of the cartridge when the corresponding tone arm is depressed downwardly toward a record.

As to each of the several embodiments of the invention described herein, it should be understood that the retracting mechanism is designed to produce a mechanical advantage so as to be adapted to lift the corresponding cartridge a greater distance than the tone arm is lowered. As one example, it will be seen from FIGURE 6 that the portion of the upper surface 72 of the lift member 70 which engages the cartridge bracket 82 is spaced further from the pivot pin 78 than is the portion of the lower surface 74 which engages the record 50. Accordingly, the member 70 is readily adapted to lift the cartridge 80 from the record when the tone arm 64 is depressed downwardly.

While certain preferred forms of my invention have been described and illustrated, it will be appreciated that modifications and changes may be made therein by those skilled in the art, particularly with my disclosure before them, and thus I do not intend to be limited to the particular disclosure, except insofar as the appended claims are so limited.

I claim:

1. In a phonograph tone arm of the type adapted to traverse and thereby reproduce a record and having a cartridge assembly which assembly includes a cartridge with a needle mounted thereon and also means for supporting the cartridge from the tone arm in a vertically compliant manner, the improvement comprising a cartridge retracting member secured directly to the tone arm adjacent the outer end thereof, said member being normally spaced from the cartridge assembly and from a record being reproduced and being adapted to engage said record upon depression of the tone arm so as to be moved upwardly relative to the tone arm into engagement with a portion of the cartridge assembly thereby to lift the cartridge and needle from the record.

2. The invention of claim 1 wherein the retracting member is made of compliant plastic.

3. The invention of claim 1 wherein the retracting member is secured to an outer end wall of the tone arm.

4. In a phonograph tone arm of the type adapted to traverse and thereby reproduce a record and having a cartridge assembly which assembly includes a cartridge with a needle mounted thereon and also means for supporting the cartridge from the tone arm in a vertically compliant manner, the improvement comprising a flexible cartridge retracting member having an upper end which is secured directly to the tone arm adjacent the outer end thereof and a lower end which extends at least partially underneath the cartridge assembly, normally in spaced relation to said assembly and to a record being reproduced, said lower end being adapted to engage said record upon depression of the tone arm so as to be bent upwardly relative to the tone arm into engagement with a portion of the cartridge assembly thereby to lift the cartridge and needle from the record.

5. The invention of claim 4 wherein said cartridge retracting member is formed with a relatively thin flexible portion which joins said upper and lower ends of said retracting member.

6. The invention of claim 4 wherein said upper end of said retracting member extends generally vertically downwardly from the tone arm and said lower end of said retracting member when in its normal relaxed position extends generally horizontally under at least a portion of said cartridge assembly.

7. The invention of claim 6 wherein said retracting member is made of compliant plastic and is formed with a relatively thin flexible portion joining said upper and lower ends.

8. In a phonograph tone arm of the type adapted to traverse and thereby reproduce a record and having a cartridge assembly which assembly includes a cartridge with a needle mounted thereon and also means for supporting the cartridge from the tone arm in a vertically compliant manner, the improvement comprising a cartridge retracting member secured directly to the tone arm adjacent the outer end thereof for pivotal movement relative to the tone arm about a generally horizontal axis, means for normally positioning said retracting member in a lower position relative to said tone arm wherein it is spaced from the cartridge assembly and from a record being reproduced, said member being adapted to engage said record upon depression of said tone arm so as to be pivoted upwardly relative to said tone arm into engagement with a portion of the cartridge assembly thereby to lift the cartridge and needle from said record.

9. The invention of claim 8 wherein said cartridge retracting member when in its normal position is out of alignment with said cartridge assembly and wherein means is provided for moving said retracting member into alignment with at least a portion of said cartridge assembly when said member is pivoted upwardly upon engagement with said record.

10. The invention of claim 9 wherein said cartridge retracting member is made of a relatively flexible material and wherein cam means is provided to bend said retracting member into alignment with at least a portion of said cartridge assembly when said member is pivoted upwardly upon engagement with said record.

References Cited in the file of this patent

UNITED STATES PATENTS

| | | |
|---|---|---|
| 2,569,305 | Gordon | Sept. 25, 1951 |
| 2,582,948 | Cairnes | Jan. 22, 1952 |
| 3,074,726 | Sioles | Jan. 22, 1963 |